United States Patent Office 3,251,824
Patented May 17, 1966

3,251,824
METHOD OF PREPARING STABLE AQUEOUS DISPERSION-FORMING CELLULOSIC AGGREGATES
Orlando A. Battista, Drexel Hill, Pa., assignor, by mesne assignments, to FMC Corporation, San Jose, Calif., a corporation of Delaware
No Drawing. Filed Aug. 22, 1961, Ser. No. 133,045
4 Claims. (Cl. 260—230)

This invention relates to finely-divided water-insoluble polysaccharide derivative aggregates capable of forming stable, colloidal dispersions and a method for preparing them.

Finely-divided cellulose crystallite aggregates capable of forming stable aqueous dispersions and gels are described and claimed in U.S. Patent No. 2,978,446 to O. A. Battista and P. A. Smith, issued April 4, 1961. These cellulose crystallite aggregates have been found to be extremely useful as non-caloric food additives, as blend components for cosmetics and pharmaceutical preparations and for a variety of other uses.

In general, without degradation of the cellulose or cellulosic polymer, it cannot be disintegrated sufficiently to obtain colloid forming particles unless very severe energy and time-consuming grinding or milling methods are employed.

It is an object of this invention to provide water-insoluble polysaccharide derivatives capable of forming stable colloidal dispersions and thixotropic gels on attrition.

It is an object of this invention to provide finely-divided, water-insoluble polysaccharide derivatives capable of forming stable colloidal dispersions and thixotropic gels.

It is an object of this invention to provide finely-divided, water-insoluble cellulose derivatives capable of forming stable colloidal dispersions and thixotropic gels.

It is another object of this invention to provide stable gel forming cellulose derivative aggregates having improved resistance to syneresis and improved resistance to bacterial attack.

It is another object of this invention to provide a method for preparing a stable gel forming, water-insoluble polysaccharide derivative material.

It is another object of this invention to provide a method for preparing a stable, gel forming polysaccharide derivative material which permits some control of the opacity of gels formed therewith.

These and other objects are accomplished according to this invention which comprises a partially degraded water-insoluble polysaccharide derivative material capable of forming a stable colloidal dispersion on attrition. In addition this invention includes the method of preparing a stable gel-forming, water-insoluble polysaccharide derivative comprising derivatizing the polysaccharide to obtain a water-insoluble derivative, degrading said derivative with a mild hydrolysis treatment sufficient to obtain a material capable of forming a stable colloidal dispersion in an aqueous medium upon attrition.

The method of this invention permits the production of higher yields of gel forming material. It provides polysaccharide aggregates with molecules having available hydrophilic groups which improve the stability of the product in aqueous mixtures.

By varying the degree of substitution in the low D.S. range, the method permits a selection of the degree of opacity of gels formed with the cellulose aggregate in aqueous medium.

The product of this invention is a more gel-stable aggregate material and in gel form retards syneresis. In many cases it will have an added tendency to resist bacterial attack depending on the nature of the substituted groups on the molecules.

The products of this invention may be used as cosmetic and pharmaceutical base material in either the dry or wet state. They may be used as food additives or blending agents depending on the nature of the substituent group. They are useful as fillers for molding resins and for a variety of other applications.

For the purpose of this invention any water-insoluble polysaccharide material including, for example, cellulose, amylose, chitin, xylan, and mannan can be utilized. Since cellulose is the preferred material of the invention because of its low cost and availability, the invention will be further described with it particularly in mind.

Cellulose source material will include wood pulp such as bleached sulfite pulp and bleached sulfate pump; natural fibers such as ramie, cotton, and purified cotton; and purified cellulose or chemical cellulose which is a high purity, granular material having high bulk density.

Derivatives which can be prepared or purchased for use in preparing the products of this invention include, for example, cellulose ethers including alkyl, aryl and aralkyl ethers of cellulose such as methyl cellulose, ethyl cellulose, propyl cellulose, butyl cellulose, amyl cellulose, phenyl cellulose, benzyl cellulose, methylpropyl cellulose, methylbenzyl cellulose, etc.; hydroxyalkyl ethers of cellulose including hydroxymethyl, hydroxyethyl, hydroxypropyl, hydroxybutyl, hydroxypropylbutyl, hydroxypropylethyl and hydroxyethylhydroxypropyl cellulose; carboxyalkyl ethers of cellulose including carboxymethyl, carboxyethyl and carboxypropyl cellulose; alkoxyalkyl ethers of cellulose including ethoxyethyl, propyloxyethyl and benzyloxyethyl cellulose; cellulose thiourethanes including cellulose thiourethane, cellulose ethylthiourethane, cellulose phenylthiourethane and cellulose ethylphenylthiourethane; cellulose esters including cellulose acetate, cellulose formate, cellulose propionate, cellulose butyrate, cellulose aceate-butyrate, cellulose acetate-propionate, cellulose acetate-stearate, hydroxypropyl cellulose acetate, benzyl cellulose acetate; partial oxidation derivatives of cellulose wherein the substituent group is attached to an anhydroglucose unit in the cellulose chain including aldehyde derivatives, carboxyl derivatives and mixed aldehyde-carboxyl derivatives of cellulose.

Generally, the above described derivatives may be prepared by any known procedure to obtain a water-insoluble product. Alkyl and aryl ethers of cellulose are usually prepared by treating cellulose with suitable alkylating agents including, e.g., alkyl halides, dialkyl sulfates, benzyl halides, etc., in the presence of an alkaline catalyst, e.g., sodium hydroxide. Mixed ethers are prepared by utilizing a mixture of alkylating agents in the etherifying process. Hydroxyalkyl ethers of cellulose can be prepared by mixing cellulose with an alkylene oxide under pressure while alkoxy and aryloxyalkyl ethers are prepared by alkylating the hydroalkyl derivative. Carboxylalkyl ethers are made by reacting cellulose with a halogen-substituted aliphatic acid, e.g., monochloroacetic, and a caustic. Esters of cellulose are conventionally prepared by treating the cellulose with the anhydride of a particular acid, e.g., acetic anhydride, propionic anhydride, butyric anhydride, etc. Mixed esters are prepared by utilizing mixed acid anhydrides. The reaction may be accelerated by using either an acid or alkaline catalyst. Aldehyde derivatives are suitably prepared by treatment of the cellulose with periodic acid while carboxyl derivatives may be prepared by treatment of cellulose with nitrogen dioxide.

It is conventional, to facilitate preparation of cellulose derivatives, to mix or slurry the cellulose in a liquid organic medium which is a solvent for the etherifying or esterifying agent. After the reaction is complete the derivatives may be washed and dried.

The cellulose derivatives of this invention must be water-insoluble in order to be capable of forming a gel or dispersion after partial degradation and attrition. The degree of substitution for each derivative is critical to obtain the desired water-insolubility. Degree of substitution denotes the average number of substituents on the anhydroglucose units of the cellulose molecule which replace any of the original three hydroxyl groups of those units. Accordingly, the maximum degree of substitution or D.S. is 3. For the purpose of this invention the D.S. of the cellulose derivative must be low enough to maintain the original water insolubility of the cellulose or high enough to be water-insoluble. The D.S. range for each water-insoluble cellulose derivatives will vary somewhat depending on the hydrophilic nature of the substituent groups. For example, the maximum D.S. for water-insoluble methyl cellulose in the low D.S. range is about 1 while the D.S. range for water-insoluble ethyl cellulose is up to about 0.5 in the low range and over about 1.8 in the upper range. Water-insoluble hydroxyethyl cellulose has a maximum D.S. in the low D.S. range of about 0.8 and a minimum D.S. in the upper range of about 1.8. Water-insoluble cellulose acetate has a maximum D.S. of about 0.3 in the low D.S. range and a minimum D.S. of about 1.2 in the upper range. The D.S. ranges for water-insoluble cellulose derivatives are well known to those practicing this art and further need for discussion is unnecessary.

The derivatization of cellulose helps to decrease the chain length of the cellulose molecule thus slightly reducing the need for additional chemical degradation of the cellulose in order to obtain an attritable material. Derivatization also advantageously increases the product yield of the attritable cellulose aggregate material.

The water-insoluble cellulose derivative, which is most usually fibrous in character, is partially degraded or reduced in chain length by a controlled hydrolysis treatment. Hydrolysis may be effected by various methods including the use of acids and enzymes but it is preferred that the cellulose derivative be hydrolyzed with a mild concentration of hydrochloric acid in aqueous solution. For example, treatment of any water-insoluble cellulose derivative with 5% hydrochloric acid solution for about 16 hours at 160° F. will be a sufficient degradation treatment for the purpose of this invention. More drastic conditions for shorter time periods will also produce similar results. Under plant conditions, for example, a 2.5% solution of HCl is used to treat the derivatized cellulose for about 1 hour at 250° F. to obtain the attritable material. The partially degraded derivative is neutralized with a mild alkaline solution and washed with water.

In contrast to the cellulose crystallite aggregate material of previously mentioned U.S. 2,978,446, the degraded cellulose derivative of this invention is not characterized by a level-off degree of polymerization or a stable average chain length. The degraded cellulose derivative retains some of the amorphous regions of the cellulose material and is not totally crystalline. However, it has been degraded sufficiently to produce a material which is attritable using mechanical disintegration means, with a nominal amount of energy, to obtain cellulose aggregates having colloidal particle size.

Mechanical disintegration of the degraded derivatives, as referred to above, may be carried out in several ways, as by subjecting them to attrition in a mill, or to a high speed cutting action, or to the action of high pressures on the order of at least 5,000 or 10,000 p.s.i. The disintegration of the derivative is carried out in the presence of a liquid medium, although where high pressure alone is employed, such medium, although desirable, is not necessary. Water is a preferred medium, but other preferably edible liquids are suitable, including sugar solutions, polyols, of which glycerol is an example, alcohols, particularly ethanol, isopropanol and the like. Whatever method is used, the disintegration is carried out to such an extent that the resulting aggregates are characterized by forming a stable suspension in the aqueous medium in which they are being attrited, or in which they may be subsequently dispersed. By a stable suspension is meant one from which the aggregate will not settle out but will remain suspended indefinitely, even for periods measured in terms of weeks or months. At lower concentrations of aggregates, the suspension is a dispersion, while at high concentrations, it is a gel. It will be understood, in this connection, that for the purposes of this invention, the term suspension includes both a dispersion and a gel; the latter expressions being defined below.

The preferred disintegration method is to attrite the degraded derivatives by means of a high speed shearing action in the presence of an aqueous medium. The derivatives may be in a dry or never-dried state prior to attrition, although some water should be present during the cutting or shearing of the particles. If they are initially in the never-dried or wet state, that is, as received from the water washing step, they have a moisture content of at least 35% by weight, and it is possible to attrite them without further addition of water, although water may be added if desired. In any event, it is preferred that the water content of the mixture undergoing attrition should be at least 20% by weight. The derivative content of the mixture to be attrited is preferably at least 3% by weight, and desirably is higher as the efficiency of the cutting action increases with the derivative content.

Suitable consistencies are those of mixtures containing up to about 25% by weight of derivative and the balance water; such mixtures lend themselves well to good attrition and are convenient to handle both during and after the disintegration; they also have the advantage of directly producing a gel. At consistencies above 25%, say from 25 to 75%, attrition produces a material which, at the lower end of this range, resembles a shiny, oleaginous paste and as the concentration increases, the material acquires a progressively firmer and wax-like appearance and consistency. A distinct advantage in the ability of the cellulose derivative aggregates to form shiny wax-like pastes at very high solids content, say up to 75% solids and higher, in water is evident. The material does not crumble at high solids content and turns directly to a powder when dried under vacuum. The appearance of the gels formed of cellulose derivative aggregates are shiny or glazed as compared to non-derivatized cellulose aggregates and range in consistency from soft wax-like materials down to oily as the solids content is reduced. The fact that gels are obtainable at concentrations as low as 3 or 4% solids is explainable by the presence of considerable amounts of aggregates of a particle size of substantially 1 micron and less, it having been found that gel formation is favored as the concentration of these fine particles increases. In fact, at concentrations as low as about 3% solids, gels are obtainable which are thixotropic provided the aggregates are substantialy all of 1 micron size and less.

Following the mechanical disintegration of the derivative, the resulting product, whether a dispersion or gel, may be taken and used as such; or it may be de-watered and dried; or it may be desirable to fractionate it into fractions having a more uniform particle size and size distribution. If the product is a mixture containing 35 to 90% solids, it may be stirred in water to form a gel, and the latter is handled as indicated. The dried products are also redispersible in aqueous media by the help of agitation, such as provided by a Waring Blendor, to form dispersions and gels.

In respect of the drying of the gels, it should be observed, first of all, that the preferred gels are those obtained by attriting the never-dried hydrolysis product; these gels have very desirable qualities in respect of smoothness, mouth feel, firmness, storage characteristics, etc. They may be dried to any practical moisture content, in which state they are redispersible in water, by the aid of a suitable attrition step, to form a gel, and this latter gel may again be dried if desired and again redispersed to form a subsequent gel. Gels are also obtainable by attriting the dried hydrolysis product, and these gels may be dried and attrited to again form gels. For producing the dried products, a number of drying procedures are available, and while redispersible materials result from each procedure, some procedures are more advantageous than others, as indicated. For example, freeze drying, spray drying, drum drying, and drying by solvent displacement each produce a material which has an appreciably lower bulk density than conventionally oven-dried materials, with freeze drying producing the lowest bulk density by far. Such a procedure produces a material which is more easily redispersible in water, by the aid of an attrition step, to form a more stable suspension than air or oven-dried materials. Freeze-dried, spray-dried, drum dried, and solvent displacement-dried materials are noticeably softer to the touch than products of the other drying steps; and freeze drying also produces a more porous product. With regard to the mouth feel of the various materials, those made by freeze drying, spray drying, and drum drying, are superior.

Fractionation of the attrited products maybe accomplished by means of such separation procedures as mechanical sifting, settling in water, or centrifuging, a number of useful fractions being obtainable, including fractions having a particle size of up to 0.2, 1, 2, 5, or 10 microns. Still another desirable fraction is one whose dimensions are all below 100 microns, or below 40 or 50 microns; a fraction in the range of about 40 to 250 or 300 microns is of special interest because of the finding that particles in this size range, particularly those having one or two dimensions of up to 250 or 300 microns, tend to have cracks, fissures, notches, voids, depressions, pores, and the like in their surfaces. Preferably, each dimension of the particles should be within the size range noted for each fraction; however, particles having two dimensions within the size range are quite useful, as are particles having but one dimension within the size range although they are less preferred.

The following examples are set forth to demonstrate the products and method of this invention.

*Example I*

An alkaline solution of hydroxyethyl cellulose having a D.S. of 0.165 was precipitated with acid, washed with water and milled in a Wiley mill so that the resulting particulate passed through a 5/16 inch screen. One hundred grams of the particulate hydroxyethyl cellulose was mixed with 900 mls. of isopropanol and 100 mls. of concentrated hydrochloric acid. The hydroxyethyl cellulose was hydrolyzed in this mixture for 6 hours at 158° F. After hydrolysis the residue was filtered, washed with water and dialyzed overnight. It was then washed thoroughly with isopropanol and air dried, yielding 90 grams of material. This material was attrited in water in a Waring Blendor for 10 minutes at 25% solids, resulting in a shiny gel which was very smooth to the touch, yet with a small amount of grit thought to be due to the original large particle size. After a week's time, the gel remained shiny with no resulting syneresis. The attrited material varied greatly in particle size ranging from colloidal up to about 250 microns.

*Example II*

Several samples of low D.S. hydroxypropyl cellulose were prepared by reacting 200 grams of purified wood pulp with 200 mls. of 10% sodium hydroxide in a mechanically agitated reaction vessel for ¾ of an hour. Thereafter a mixture of 50 mls. of propylene oxide and 50 mls. of dioxane were added to the alkali cellulose. Several different samples were prepared by reacting at different temperatures and for varying time periods. The first batch was reacted for 2 hours at room temperature. The second batch was reacted for 6 hours at room temperature and the third batch was reacted for 2 hours at about 152° F. Each of the above samples was then washed with a 50/50 mixture of acetone and water followed by a 75/25 mixture of acetone and water followed by a straight acetone wash. All of the samples were insoluble in water. However, the third sample exhibited a very high degree of swelling.

All of the samples were washed with water to remove the acetone, adjusted to a solids concentration of 35% in water and attrited in a Hobart mixer for 25 minutes. In each case the resulting pastes were extremely smooth and shiny with a wax-like consistency. Some of the material was attrited at various solids contents up to 70% solids and it was noted that in every case a smooth waxy material resulted with no crumbling.

The gels from the Hobart mixer were reduced to a solids content of 15% and mixed in a Mixmaster for 7 minutes. The resulting gels resembled cold cream with somewhat more transparency. Thin sheets cast and dried from these gels had a waxy texture.

*Example III*

Fifty grams of commercially available water-insoluble derivatized cotton linters (hydroxyethyl cellulose) were hydrolyzed with 2000 mls. of 10% hydrochloric acid at about 158° F. for 17 hours. The hydrolyzed hydroxyethyl cellulose, after mechanical attrition at high solids content for about 30 minutes, produced a gel of unique characteristics. At 51% solids content, the gel had the apparent viscosity of a thick, heavy, waxy, extremely smooth and stable material and remained so after continued working between the fingers. These gel properties appear to be very desirable for cosmetic applications.

*Example IV*

Seventy-five grams of cellulose triacetate was hydrolyzed with 300 mls. of 5% hydrochloric acid and heated to 158° F. for 16 hours. After hydrolysis the sample was attrited at 35% solids in water in a Hobart mixer for 45 minutes followed by the addition of water to obtain a 15% solids concentration. The resulting mixture was then worked in a Mixmaster for 7 minutes. A smooth, shiny gel, somewhat translucent, with good syneresis properties was obtained.

*Example V*

A sample of low D.S. (0.05–0.06) hydroxyethyl cellulose was hydrolyzed with a 5% hydrochloric acid solution for 16 hours at 158° F. Thereafter the hydrolyzed hydroxyethyl cellulose was attrited at 35% solids content in water in a Hobart mixer for 25 minutes. After diluting with water to a solids content of 15%, the mixture was then worked in a Mixmaster for 7 minutes. The resulting smooth shiny gel exhibited improved syneresis properties. The gel also exhibited some degree of translucency and took on a bluish cast. When high solids content gels above 70% solids were prepared with the same hydrolyzed hydroxyethyl cellulose material as defined above, smooth wax-like thick gels were obtained with no crumbs or crumbly material apparent.

The mechanical attrition devices mentioned herein including the Wiley mill and Waring Blendor are well-known laboratory apparatus described, for example, in the laboratory supply catalogue of the Scientific Equipment Co., Philadelphia, Pa., copyright 1959. The Mixmaster is a conventional electrically driven kitchen mixer, and the Hobart mixer is an electrically driven planetary mixer.

Various changes and modifications may be made in practicing this invention without departing from the spirit and scope thereof and, therefore, the invention is not to be limited except as defined in the appended claims.

I claim:
1. A method of preparing a cellulosic material capable of forming a stable dispersion which comprises hydrolyzing a water-insoluble material selected from the group consisting of a cellulose ether and a cellulose ester of an organic acid with hydrochloric acid to at least about a degree of degradation equivalent to the degradation of said water-insoluble material obtained by treatment with an aqueous 5% hydrochloric acid solution for about 16 hours at about 160° F., and mechanically attriting the resulting hydrolyzed, water-insoluble material to form colloid-forming particles.

2. The method of claim 1 wherein the water-insoluble material is a cellulose ether.

3. The method of claim 1 wherein the water-insoluble material is a cellulose ester of an organic acid.

4. The method of claim 1 wherein the resulting hydrolyzed water-insoluble material is attrited in water at a solids concentration of at least 3% up to 75% until a stable dispersion is formed.

References Cited by the Examiner
UNITED STATES PATENTS

| | | | |
|---|---|---|---|
| 2,085,733 | 7/1937 | Bird et al. | 167—85 |
| 2,978,446 | 4/1961 | Battista et al. | 260—212 |
| 3,111,513 | 11/1963 | Battista et al. | 260—212 |
| 3,146,168 | 8/1964 | Battista | 260—212 X |
| 3,146,170 | 8/1964 | Battista | 167—91 X |

WILLIAM H. SHORT, *Primary Examiner.*
TOBIAS E. LEVOW, *Examiner.*